April 14, 1970     I. J. ALLEN     3,506,191
SHAFT CONSTRUCTION FOR NON-REVERSIBLE ODOMETER
Filed Jan. 13, 1969
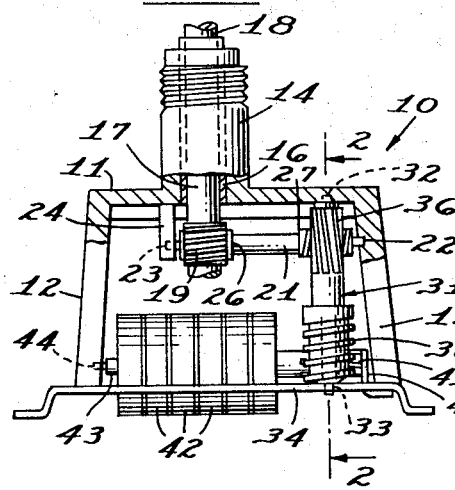
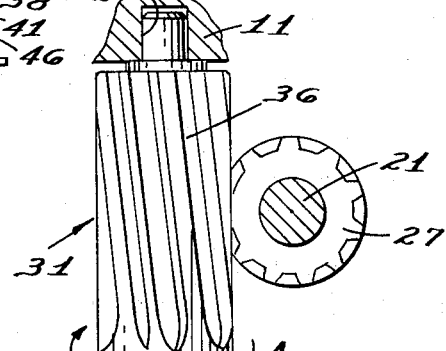
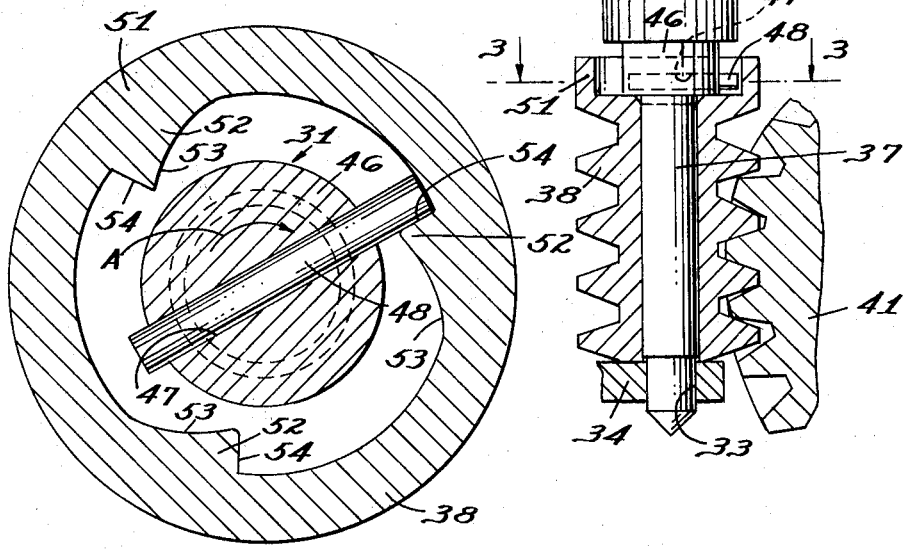
INVENTOR
IVIS J. ALLEN
BY John R. Faulkner
William E. Johnson
ATTORNEYS 3,506,191
SHAFT CONSTRUCTION FOR NON-REVERSIBLE
                      ODOMETER
Ivis J. Allen, Ann Arbor, Mich., assignor to Ford Motor
   Company, Dearborn, Mich., a corporation of Delaware
           Filed Jan. 13, 1969, Ser. No. 790,682
            Int. Cl. G01c 22/00; G06m 1/08
U.S. Cl. 235—96                                      3 Claims

ABSTRACT OF THE DISCLOSURE

A non-reversible odometer for a driven vehicle includes a plurality of driven number wheels which display the total distance traveled by the vehicle. The drive train of the odometer is designed so that an input thereto which increases the total indicated travel of the vehicle is transmitted through the gear train to increase the travel distance displayed on the number wheels. On the other hand, if the input to the odometer is one which would decrease the total displayed travel of the vehicle, the drive between the input shaft and the number wheels is interrupted and no decrease is effective.

BACKGROUND OF THE INVENTION

Most driven vehicles are equipped with an odometer which records the total distance traveled by the vehicle. This indication of the total travel of the vehicle is important to a used vehicle purchaser. The total distance already traveled by the vehicle generally indicates the total distance left for normal usable operation of the vehicle. This is particularly true with respect to both certain engine components and certain components which must be repaired or replaced at approximately fixed increments of vehicle travel.
   To mislead the purchaser of a used motor vehicle, the vehicle's odometer is sometimes reset to reduce the total indicated vehicle travel recorded thereon. More particularly, if the normal rotational input to the odometer is reversed, a reduction is effected in the total travel distance indicated thereon. When the reverse input to the odometer is at a high rotational rate, it is easy to run off a substantial amount of indicated vehicle travel within a short period of time.

SUMMARY OF THE INVENTION

This invention relates to a shaft construction for a non-reversible odometer and, more particularly, to a shaft construction for a non-reversible odometer in which the driving interconnection between the input member and the display device of the odometer is interrupted if the input member is driven in a direction which would result in a reduction of the total indicated distance on the odometer.
   In accordance with the teachings of this invention, the non-reversible odometer for use in a vehicle to indicate the total distance traveled by the vehicle is constructed in the following manner. The odometer includes a frame and an input shaft rotatably mounted in the frame, the input shaft being driven by apparatus responsive to movement of the vehicle. A plurality of number wheels are supported for rotation in the frame and these display an indication of the distance traveled by the vehicle. A gear drive is associated with the number wheels for rotatively displacing the number wheels in order to vary the displayed indication of the distance traveled by the vehicle. A gear train, supported in the frame, interconnects the input shaft and the gear drive associated with the number wheels. The gear train has a primary shaft having both a portion with a reduced diameter and a portion with a bore across the diameter thereof at a position adjacent the reduced diameter portion. A drive gear, which is in engagement with the gear drive associated with the number wheels, is rotatably mounted on the reduced diameter portion of the primary shaft. An annular ring is formed on the drive gear in such a position as to encircle the portion of the primary shaft having the bore therethrough. A one-way drive cam surface is formed on the internal surface of the annular ring of the drive gear in a position facing the portion of the shaft having the bore therethrough. A drive pin is mounted for axial movement in the bore of the primary shaft. This drive pin engages a portion of the one-way drive cam surface when the primary shaft is rotated in a particular direction thereby interconnecting the input shaft and the number wheels to increase the total displayed distance of travel on the odometer. However, when the primary shaft is moved in a direction opposite the particular direction, the drive pin moves continuously relative to the one-way drive cam surface. Thus, no driving connection is made to the number wheels from the input shaft and no change is occasioned in the display of the number wheels.

BRIEF DESCRIPTION OF THE DRAWINGS

FIGURE 1 is a plan view of non-reversible odometer formed in accordance with the teachings of this invention. FIGURE 2 is a view taken along line 2—2 of FIGURE 1 showing, in greater detail, the non-reversible odometer. FIGURE 3 is a view taken along line 3—3 of FIGURE 2 showing, in cross section, details of the structure of the non-reversible odometer.

DESCRIPTION OF THE PREFERRED
                        EMBODIMENT

General construction

In FIGURE 1 a non-reversible odometer is shown and generally identified by the numeral 10. The odometer has a frame 11 which has side walls 12 and 13 as well as a tubular housing 14 extending therefrom. The tubular housing 14 has an internal bearing 16 which supports for rotative movement therewithin an input shaft 17. One end 18 of the shaft is coupled to and driven by a speedometer or odometer input device which is driven in a known manner by some portion of a motor vehicle such as the transmission thereof. A gear 19 is formed on the portion of the input shaft which extends into the space between the side walls of the odometer frame.
   A cross shaft 21 is supported at its right end as viewed in FIGURE 1 in a bearing surface 22 formed in the side wall 13 of the frame 11. The other end of the shaft is supported in a bearing surface 23 formed in a projecting portion 24 of the frame 11. The cross shaft has a gear 26 formed thereon which is in meshing engagement with the gear 19 of the input shaft 17. The cross shaft also has a second gear 27 thereon at its end adjacent to the side wall 13.
   A primary shaft, generally designated by the numeral 31, is supported for rotation at one end in a bearing surface 32 formed in the back portion of frame 11 and at the other end in a bearing surface 33 formed in a housing member 34. The housing member is attached and supported at opposite ends by the side walls 12 and 13 of the frame 11. As best seen in FIGURE 2, the primary shaft 31 has a gear 36 thereon in meshing engagement with the gear 27 of the cross shaft 21. The primary shaft also has a portion 37 thereof of a reduced diameter upon which a drive gear 38 is rotatably mounted. In turn the drive gear 38 is in engagement with a gear 41 which is drivingly associated with a plurality of odometer number wheels 42 (FIGURE 1). The number wheels are mounted on a shaft 43 supported at one end in a bearing surface 44 formed in the side wall 12 and at the other end in a bearing surface formed in a member 46, which member is, in turn, secured to and supported by the side wall 13.

The exact method and manner in which the gear 41 displaces the number wheels 42 so as to indicate the total travel of the vehicle may take any one of the many forms known in the prior art. Typical odometer drive structures are shown in U.S. Patents 3,116,875, 3,137,444, 3,250,468 and 3,333,768.

Now with particular reference to FIGURES 2 and 3, the interruptable drive connection formed between the primary shaft 31 and the drive gear 38 supported thereon will be described in detail. A central portion 46 (see FIGURE 2) of the primary shaft 31 has a bore 47 extending across the diameter thereof. A pin 48 is received within and axially movable along the bore 47.

The drive gear 38, at that portion thereof overlying the central portion 46 of the primary shaft 31 is in the form of an annular ring 51. The internal surface of the annular ring 51 has a one-way drive cam track formed thereon. This drive cam track is in the form of three inwardly projecting cam members 52. Each of the cam members 52 has a gradually rising cam surface 53 which terminates in a drop-off 54. The three cam members are equally spaced about the internal circumference of the ring 51 in such a position that the highest point of the cam surface 53 is diametrically opposed from a portion of the circumference of the ring which is of full radius.

OPERATION

Operation of the non-reversible odometer of this invention is as follows. An input to the input shaft 17 in response to the forward travel of the vehicle is in such a direction that the rotation of the primary shaft 31 by the cross shaft 21 is in the direction of arrow A of FIGURE 2. With such a rotational direction established in the primary shaft 31, the drive pin 48 held within the bore 47 of the central portion 46 of the shaft moves into driving contact with a drop-off 54 of one of the cam members 52 formed on the annular ring 51 of the drive gear 38. The drive pin is of such a length that even if it is shifted to the left as viewed in FIGURE 3, a substantial portion of the pin will still be in driving contact with the drop-off 54. Thus, the primary shaft 31 through its drive pin makes driving contact with the drive gear 38. Displacement of the drive gear 38 in turn actuates the gear drive 41 for the plurality of odometer number wheels 42 whereby the number wheels are displaced to indicate an increase in the distance traveled by the vehicle.

When a reverse input is supplied to the input shaft 17 in an attempt to reduce the total indicated distance on the odometer wheels 42, the rotational movement delivered to the primary shaft 31 by the cross shaft 21 is in a direction opposite that indicated by arrow A of FIGURE 2. With such a rotational direction delivered to the primary shaft, the shaft is rotated in a direction that causes movement of the drive pin 48 in a counterclockwise direction as viewed in FIGURE 3. During the continuation of such a movement, the drive pin 48 passes up the cam surafce 53 of the first engaged cam number 52 and then over the drop-off 54 of that cam member. Further rotation of the shaft 31 in the counterclockwise direction repeats the movement of the drive pin 48 up the cam surfaces of the cam members and over their associated drop-offs. Thus, a reverse input to the input shaft 17 results in an interruption of the drive connection between the primary shaft 31 and the drive gear 38 whereby no driving relationship is established between these two elements. The odometer gear drive 41 is not actuated and no displacement is occasioned in the odometer number wheels 42.

The preferred embodiment of the non-reversible odometer of this invention has been described. This odometer permits the recordation of actual distance covered when the vehicle is traveling in a normal direction. Any attempt to reverse the input to the odometer and thereby reduce the total indicated display of the odometer is stymied by interruption of the drive connection between the input shaft and the gear drive associated with the odometer number wheels.

What is claimed is:

1. In a non-reversible odometer for use in a vehicle to indicate the total distance traveled by the vehicle, which odometer includes: a frame; an input shaft rotatably mounted in the frame, the input shaft being driven by apparatus responsive to movement of the vehicle; a plurality of number wheels supported for rotation in the frame for displaying an indication of the distance traveled by the vehicle; a gear drive associated with the number wheels for rotatively driving the number wheels to vary the displayed indication of the distance traveled by the vehicle; a gear train supported by the frame for interconnecting the input shaft and the gear drive; the improvement in the gear drive train which comprises:

a primary shaft having both a portion thereof of a reduced diameter and a bore extending across the diameter thereof at a position adjacent said reduced portion thereof;

a drive gear engaging the gear drive associated with the number wheels, the drive gear being rotatably mounted on said reduced diameter portion of said shaft, the end of said drive gear associated with said portion of said shaft having said bore therethrough being formed as an annular ring encircling said portion of said shaft having said bore;

a one-way drive cam surface formed on the internal surface of said annular ring of said drive gear in facing relationship to said portion of said shaft having said bore therethrough; and a drive pin means axially movable in said bore of said primary shaft both for drivingly engaging a portion of said one-way drive cam surface when said primary shaft is rotated in a particular direction thereby to effectively drive the number wheels to increase the total displayed distance of travel on the odometer and for moving continuously relative to said cam surface when said primary shaft is rotated opposite to the particular direction whereby no change is occasioned in the displayed distance of the odometer wheels.

2. The non-reversible odometer of claim 1 wherein said one-way drive cam surface formed on the internal surface of said annular ring of said drive gear is in the form of a plurality of gradually rising surfaces terminating in sharp drop-offs and wherein said sharp drop-offs are not diametrically opposed to an associated one of said gradually rising surfaces; and wherein said drive pin means is a pin movable within said bore formed through said primary drive shaft, said pin engaging one of said sharp drop-offs when said primary shaft is rotated in a direction to increase the displayed mileage on said odometer wheel and wherein when said primary shaft is rotated in a direction opposite a particular direction said pin is moved upwardly along the gradually rising surface of said drive cam surface and over said drop-off repeatedly on associated ones of said cam surfaces and drop-offs as said primary shaft is rotated opposite said particular direction whereby no driving connection is made to the odometer wheels from the input shaft of the odometer.

3. The non-reversible odometer as defined in claim 2 wherein three equal length and equally spaced cam surfaces and associated drop-offs are provided.

References Cited

UNITED STATES PATENTS

| | | | |
|---|---|---|---|
| 1,798,941 | 3/1931 | Helgeby | 235—131 |
| 2,342,325 | 2/1944 | Bliss | 235—144 |
| 2,996,241 | 8/1961 | Hoffmann | 235—1 |
| 3,131,860 | 5/1964 | McKean et al. | 235—118 |

STEPHEN J. TOMSKY, Primary Examiner

U.S. Cl. X.R.

235—1